United States Patent Office 3,424,822
Patented Jan. 28, 1969

3,424,822
ALKALI METAL CATALYZED STYRENE DEPOLYMERIZATION
Thomas V. Liston, Kentfield, Calif., assignor to Chevron Research Company, San Francisco, Calif., a corporation of Delaware
No Drawing. Filed July 21, 1966, Ser. No. 566,750
U.S. Cl. 260—881　　　　　　　　　　　　　　5 Claims
Int. Cl. C08f 27/28, 19/16, 19/10

ABSTRACT OF THE DISCLOSURE

Styrene depolymerization is carried out using alkali metal catalyst in an aromatic hydrocarbon and hexamethylphosphortriamide mixture as solvent. Blocks of anionic addition polymerizable olefins can be added to the degraded styrene polymer.

---

This invention concerns a novel method for reducing the molecular weight of styrene polymers and modifying the polymers thus obtained.

In many applications, molecular weights of polystyrene are desired that are not readily obtained by free radical or "Ziegler-type" polymerization. That is, the polymers obtained by the usual methods of polymerization are of much too high molecular weight. One method of depolymerizing polystyrene is disclosed in U.S. Patent No. 2,549,538. This method uses a catalyst which produces a carbonium ion: aluminum chloride plus an aliphatic chloride.

It has now been found that by contacting polystyrene in the liquid phase in an inert solvent with an alkali metal or alkali metal dialkylamide at elevated temperatures, the polystyrene can be depolymerized and the resulting low molecular weight polystyrene modified.

The polystyrene used can be of any molecular weight, ranging from 5,000 to 5,000,000, more usually from about 25,000 to about 3,000,000. The polystyrene can be prepared by any convenient polymerization means. Styrene is readily polymerized using free radical catalysis in an inert media, in an emulsified media or neat; by heat; anionic catalysis; cationic catalysis; or heterogeneous catalysis such as Ziegler-type catalysts, e.g., titanium trichloride and triethyl aluminum. The method of polymerization of the polymer does not affect the operability of this process.

The metals used are alkali metals of atomic number 11 through 19, i.e., sodium and potassium. Potassium is particularly preferred. While lithium does have some activity, it is less active than sodium and significantly less active than potassium.

The dialkylamides will generally have lower alkyl groups (1 to 6 carbon atoms) such as methyl, ethyl, isopropyl, pentyl, etc. Preferably, the alkyl group will be of from 1 to 2 carbon atoms, i.e., methyl and ethyl. Of course, the two alkyl groups may be taken together to form a heterocyclic ring having the one amino nitrogen as its only heteroatom, e.g., piperidine, pyrrolidine, etc.

The formula of the metal amide is $MNR_2$ wherein M is an alkali metal of atomic number in the range of 11 to 19, preferably potassium, and R is a lower alkyl group of from 1 to 6 carbon atoms or, when the two R's are taken together they form, with the nitrogen to which they are attached, a ring having from 5 to 6 annular members.

The solvents used are generally mixed solvents containing an inert aromatic hydrocarbon in which the polystyrene is soluble and a polar nonacidic solvent which is effective in dissolving the alkali metal. By choosing the proper solvents, the refluxing solvent can be used for temperature control. Illustrative aromatic hydrocarbons include benzene, tert.-butyl benzene, etc. That is, aromatic hydrocarbons which do not compete with the polystyrene and do not have an acidic hydrogen. The preferred polar solvent is hexamethylphosphortriamide. This solvent has lower acidity than the polystyrene (no acidic hydrogen as compared to polystyrene).

The liquid system should be a homogeneous system, once the metal or metal amide has dissolved. That is, at the temperatures and concentrations used, the reactants should be soluble or become soluble during the reaction, and the solvents should be miscible.

The mole ratio of metal to polymer will generally be in the range of about 5 to 500 millimoles of metal per mole of polymer, more usually in the range of about 50 to 300 millimoles of metal per mole of polymer. Increasing amounts of metal will of course enhance the degree of depolymerization.

The amount of solvent used is not critical as long as a relatively fluid low viscosity system is obtained. Usually, the polymer will be present in from about 1 to 25 weight percent, more usually from about 5 to 20 weight percent of the aromatic hydrocarbon solvent, while the metal or metal amide will be present in from about 0.5 to 5 weight percent of the polar solvent.

The order of addition of the materials is not critical to the invention. That is, the metal or metal amide may be added to the polar solvent and then the aromatic hydrocarbon solution of the polymer added to the metal-polar solvent mixture. Alternatively, the metal or metal amide may be added to a mixture of the polymer, polar solvent and aromatic hydrocarbon solvent.

The time for the reaction will vary, depending on the degree of depolymerization desired, the ratio of reactants and the temperature at which the reaction is carried out. Usually, the time will not be less than about 30 mins. and not longer than about 24 hours, more usually in the range of about 1 hour to 20 hours. The time is not critical, being a variable, dependent upon the other reaction conditions.

The reaction temperature will generally vary from about 50° C. to 150° C., more usually from about 60° to 125° C.

The reaction is carried out in the substantial absence of oxygen. The presence of oxygen will vary the product's properties, since oxygen will react with organic carbonions to form a variety of products.

The degree of depolymerization may be monitored during the reaction by removing aliquots and determining the viscosity of the polymer. When the desired degree of depolymerization has been obtained, the reaction may be quenched by the addition of any hydroxylic solvent and the resulting polymer isolated. However, if the polymer is to be modified, a modifying agent may be added to the reaction mixture. Modifying agents include carbon dioxide, addition polymerizable olefins which are catalyzed by anionic catalysis, etc. Illustrative of the latter class are acrylonitrile, α-methylstyrene, acrylate and methacrylate esters, ring-substituted styrenes, etc. The modifying agents are compounds which will react with a carbanion to form a product.

The following examples are offered by way of illustration and not by way of limitation.

EXAMPLE I

Into a reaction flask was introduced 1 g. (25.6 mM) of potassium metal and 50 ml. of hexamethylphosphoramide. The solution was stirred with a glass paddle under nitrogen. After about 1 hour the solution turned red and 20 g. of polystyrene (intrinsic viscosity, $\eta_{25°}$ c. (toluene), 0.880; mol. wt., 310,000) in 200 ml. of benzene was added. The mixture was maintained at reflux for 16 hours and then cooled. An aliquot was removed, quenched in methanol and the intrinsic viscosity determined: $\eta_{25°\ C.}$ (toluene), 0.11; mol. wt., 14,300.

To the main body of the reaction mixture was added aliquots of 4.2 g. of acrylonitrile. With the first three additions, heat was evolved, but on the fourth addition no heat was evolved. A total of 16.8 g. of acrylonitrile was added. The mixture was filtered and the solids washed with methanol yielding 9.0 g. of an insoluble yellow polymer. The filtrate was precipitated into methanol, washed with methanol and yielded 18.7 g. of polymer. The soluble polymer had an intrinsic viscosity, $\eta_{25°\ C.}$ (toluene), 0.13; mol. wt., 17,900; an infrared spectrum showed the presence of the nitrile band.

EXAMPLE II

Into a reaction flask in an inert atmosphere was added 20 g. of styrene (intrinsic viscosity, $\eta_{25°\ C.}$ (toluene), 0.880; mol. wt., 310,000) in 200 ml. of benzene and 50 ml. of hexamethylphosphoramide. To this mixture was added 1 g. (25.6 mM) of potassium and the mixture heated to reflux and allowed to reflux overnight (16 hours). At the end of this time, the reaction mixture was allowed to cool, filtered, the filtrate poured into methanol and the resulting solids isolated. After drying, the product weighed 18.5 g. Intrinsic viscosity, $\eta_{25°\ C.}$ (toluene), 0.174; mol. wt. 26,000.

EXAMPLE III

Into a reaction flask was introduced 0.59 g. (25 mM.) of sodium in 50 ml. of hexamethylphosphoramide and the mixture stirred for 18 hours. To this mixture was then added 20 g. of polystyrene (intrinsic viscosity, $\eta_{30°\ C.}$ (toluene), 0.808; mol. wt., 310,000) in benzene and the mixture heated at reflux for 4 hours. After allowing the mixture to cool, stirring was continued for a further 18 hours and then oxygen bubbled in for 1 hour. The product was then quenched in methanol/hydrochloric acid, followed by washing with methanol. After drying, the product had an intrinsic viscosity, $\eta_{30°\ C.}$ (toluene), 0.730; mol. wt., 270,000.

It is evident from the above results that polystyrene may be readily depolymerized to lower molecular weight products which may then be modified in a variety of ways to produce new materials having enhanced properties. By introducing polar reagents such as carboxyl groups or nonhydrocarbon addition polymerizable olefins, the resulting product may be more readily dyed, have higher solubility in polar solvents, lower its Tg (glass transition temperature) thereby decreasing its brittleness, increase its adhesion to metals, e.g., Al, etc.

As will be evident to those skilled in the art, various modifications on this invention can be made or followed, in the light of the foregoing disclosure and discussion, without departing from the spirit or scope of the disclosure or from the scope of the following claims.

I claim:
1. A method for depolymerizing polystyrene which comprises contacting polystyrene of at least about 5,000 molecular weight with an alkali metal, wherein the alkali metal is of atomic number 11 through 19, and the mole ratio of metal to polymer is in the range of 5 to 500 millimoles of metal per mole of polymer in the presence of an aromatic hydrocarbon solvent having an acidity equal to or less than polystyrene and hexamethylphosphortriamide, at a temperature in the range of about 50° to 150° C. and in the substantial absence of oxygen.
2. A method according to claim 1, wherein said alkali metal is potassium.
3. A method according to claim 1, wherein the polystyrene is present in from 1 to 25 weight percent of the aromatic hydrocarbon solvent and the alkali metal is present in from about 0.5 to 5 weight percent of the hexamethylphosphortriamide.
4. A method according to claim 1, wherein in anionic catalyzed addition polymerizable olefin selected from the group consisting of acrylonitrile and acrylate esters is added when the polystyrene has depolymerized to the desired degree.
5. A method according to claim 4, wherein said anionic catalyzed addition polymerizable olefin is acrylonitrile.

References Cited

UNITED STATES PATENTS

| | | |
|---|---|---|
| 2,896,264 | 7/1959 | Natta, et al. |
| 2,962,488 | 11/1960 | Horne. |
| 3,143,536 | 8/1964 | Guzzetta. |

OTHER REFERENCES

Morton et al.: Metalation of Polystyrene, J. Pol. Sci., vol. 24, August 1959, pp. 1167–1169.

Spodheim et al.: Polymerization—Degradation of Styrene, J. Pol. Sci., vol. 3, No. 3, 1948, pp. 410–412.

Hirota et al.: ESR of Anions, J. Pol. Sci. 60, pp. 552–554, 1961.

SAMUEL H. BLECH, *Primary Examiner.*

J. T. GOOLKASIAN, *Assistant Examiner.*

U.S. Cl. X.R.

260—30.6, 33.6, 93.5, 885, 886